No. 657,626. Patented Sept. 11, 1900.
W. F. STIEL.
APPARATUS FOR MANUFACTURING PLATES.
(Application filed July 27, 1899. Renewed June 30, 1900.)

(No Model.) 3 Sheets—Sheet 1.

Witnesses:
G. S. Noble
J. Buehler

Inventor.
Werner Franz Stiel
by B. Singer
Att'y.

THE NORRIS PETERS CO., PHOTO-LITHO., WASHINGTON, D. C.

No. 657,626. Patented Sept. 11, 1900.
W. F. STIEL.
APPARATUS FOR MANUFACTURING PLATES.
(Application filed July 27, 1899. Renewed June 30, 1900.)
(No Model.) 3 Sheets—Sheet 2.
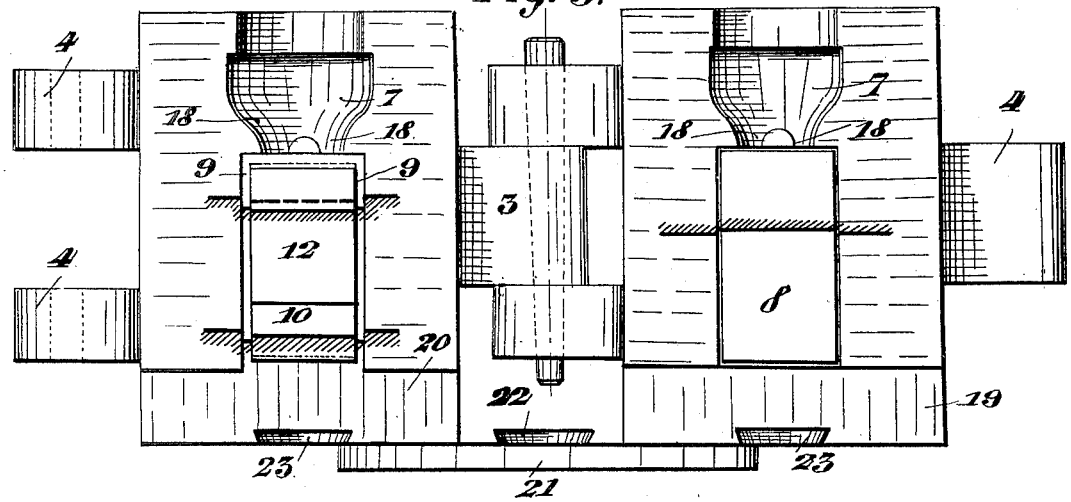
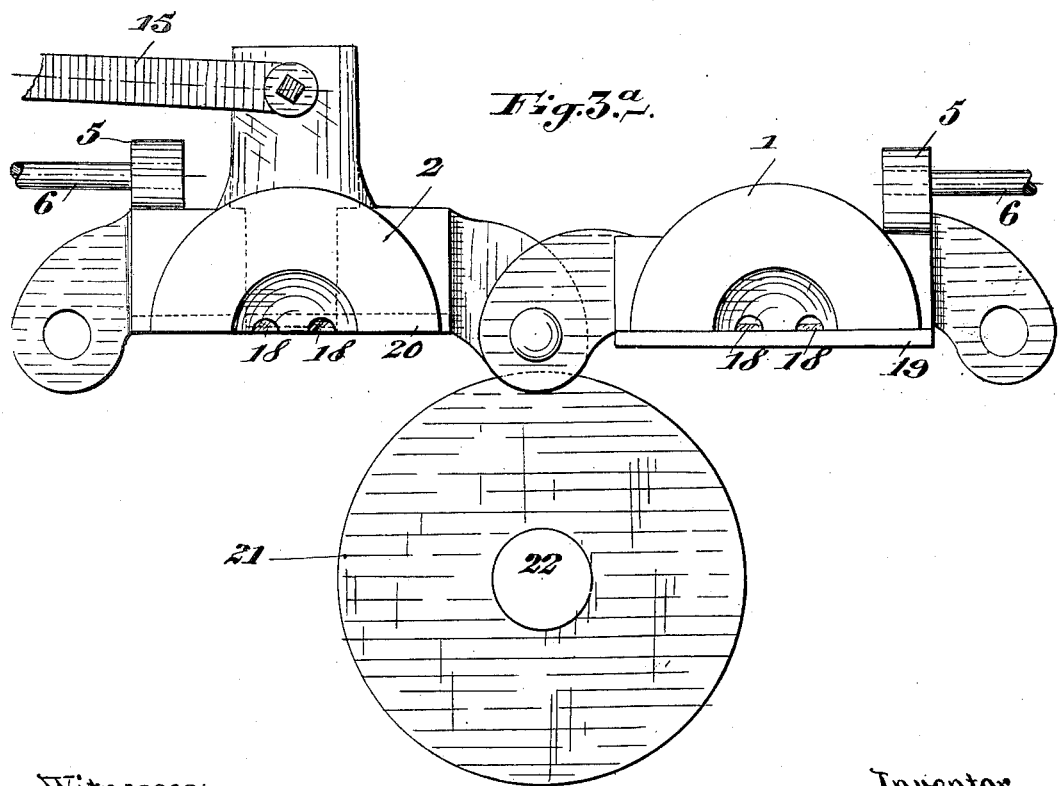
Witnesses:
G. S. Noble
J. Buehler
Inventor,
Werner Franz Stiel
by B. Singer
Att'y.

No. 657,626. Patented Sept. 11, 1900.
W. F. STIEL.
APPARATUS FOR MANUFACTURING PLATES.
(Application filed July 27, 1899. Renewed June 30, 1900.)
(No Model.) 3 Sheets—Sheet 3.
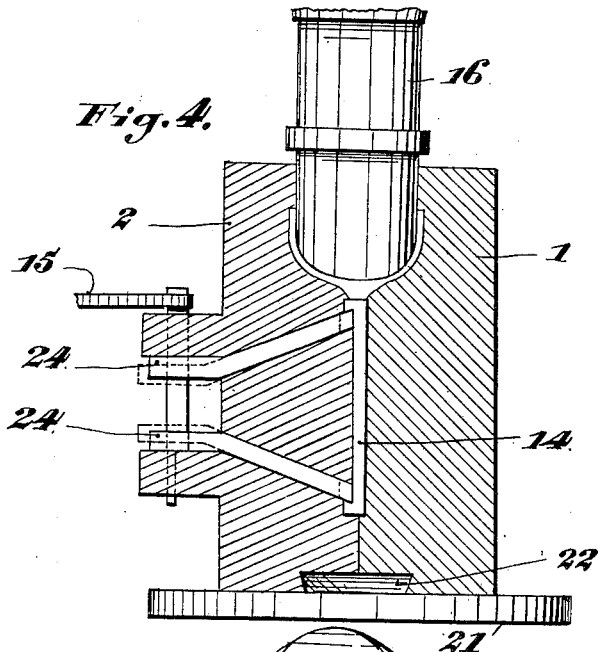
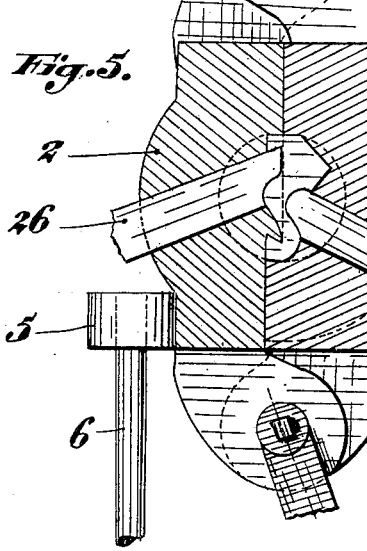
Witnesses:
G. S. Noble
J. Buehler
Inventor,
Werner Franz Stiel
by B. Singer Att'y.

UNITED STATES PATENT OFFICE.

WERNER FRANZ STIEL, OF COLOGNE, GERMANY.

APPARATUS FOR MANUFACTURING PLATES.

SPECIFICATION forming part of Letters Patent No. 657,626, dated September 11, 1900.

Application filed July 27, 1899. Renewed June 30, 1900. Serial No. 22,201. (No model.)

*To all whom it may concern:*

Be it known that I, WERNER FRANZ STIEL, a subject of the German Emperor, residing at Cologne, Germany, have invented certain new and useful Improvements in Apparatus for Manufacturing Plates, of which the following is a specification.

My present invention relates to the manufacture of plates of plastic material, the object being to provide an improved apparatus for manufacturing such plates by means of suitable well-known presses or like devices, said plates having their backs provided with inclined recesses or projections or extensions for the purpose of being easily and securely held in place by means of cement, plaster, or the like, or said recesses or extensions being provided on the face of the plates for ornamentation.

The improvements consist in the construction, novel combination, and arrangement of parts, as fully described hereinafter, and specifically pointed out in the claims.

In order that this my invention may be the more readily understood and carried into effect or practice, reference is hereby made to the accompanying drawings, forming a part of this specification, and in which—

Figure 1:
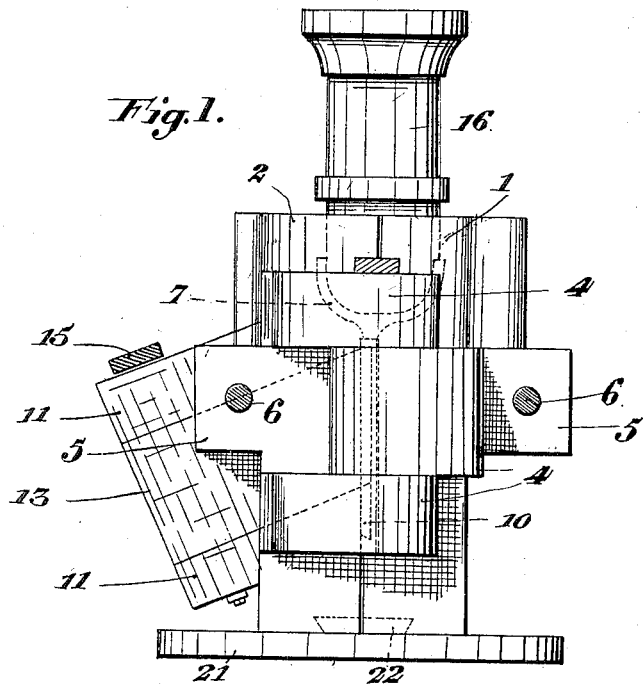
Figure 2:
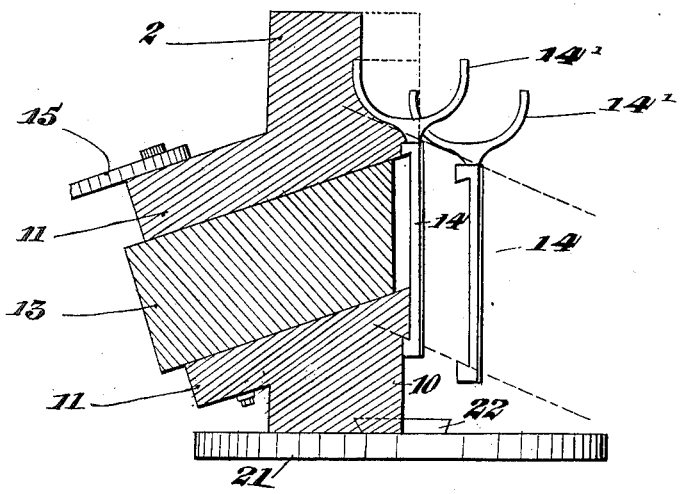

Figure 1 is an elevation of the improved mold in operation. Fig. 2 is a vertical section of one half of the mold, showing the manner of removing the molded plate. Fig. 3 shows the two halves of the improved mold in their open positions. Fig. 3ª is a plan view corresponding to Fig. 3. Fig. 4 shows a slightly-modified construction of the mold. Fig. 5 illustrates a mold for manufacturing ornamental plates.

Like numerals refer to like parts throughout all the figures.

The improved mold consists of two halves 1 2, connected with each other by means of hinges 3 and adapted to be securely held in closed position by means of any suitable device, such as a hasp 4. The mold halves 1 and 2 are provided with lugs 5 5, in which are secured handles or equivalents 6 6 for easily manipulating said mold halves. The upper parts of the latter are suitably recessed, so as to form a sort of funnel or reservoir 7 when they are brought together into their closed positions for molding a plate. The inner side of the mold half 1 is provided with a rectangular recess 8, Fig. 3, of the size of the plate to be produced, while the inner opposite side of the mold half 2 is provided with another recess 9, formed as shown in Fig. 3, and with a projecting part 10, the under side of which is inclined downwardly, as shown in Fig. 2. The mold half 2 is further provided with an outwardly-projecting part 11, in which is located an upwardly-inclined passage or guide way 12, Fig. 3, for a movable rectangular slide 13, Figs. 1 and 2, serving to form the upper inclined side of the recess in the plate 14. Said movable slide 13 may be moved by means of a handle or equivalent 15, suitably connected with the slide for this purpose, so that the rotation of said handle or equivalent produces the forward or backward movement of said slide. The upper part of the funnel or reservoir 7 is made of cylindrical form and serves to receive and guide the vertically-movable pressing-stamp 16, which may be actuated by hand or in any other way, and the lower end of which is rounded to correspond to the bottom of the funnel or reservoir 7. The latter is connected to the inner recesses in the mold halves through one, two, or more passages 18, as shown. The lower part of the mold half 1 is provided with a projecting part 19, fitting into a corresponding recess 20 made in the mold half 2. From the foregoing it will be readily understood that the different recesses in said mold halves form an inner hollow space having the shape of the plate to be produced when said mold halves are brought together and when the lateral slide 13 is moved forward toward the interior of the mold.

In operation the mold halves 1 and 2 are placed in open position upon a horizontal plate 21, provided with a central dovetail projection 22, adapted to be engaged by corresponding recesses 23, provided in the mold halves 1 and 2, when the latter are in their closed position. Then the liquid glass or enamel or other material serving to manufacture plates is fed into the upper reservoir 7, whence it flows downward through the passages 18 into the inner hollow space of the mold to fill the latter. Now the vertical stamp or piston 16 is moved downward into the reservoir 7 to produce a slight pressure upon the liquid mass. Then the latter is left for cooling. To remove the plate from the mold, the mold halves are opened, the lateral slide 13 withdrawn, and then the plate may be removed in the inclined direction indicated by dotted lines in Fig. 2. The lateral slide 13 is prevented from being moved too far inwardly by means of any suitable stop or equivalent. (Not shown.)

In the construction shown in Fig. 4 the mold half 2 is provided with two oppositely-inclined guideways, in which are moved two lateral pistons or slides 24 for forming the inclined sides of the recess in the plate 14, said slides 24 being suitably connected with the handle or equivalent 15. For removing the plate from the mold the mold half is rotated and the slides 24 withdrawn and brought into the dotted-line position, whereupon the plate may be easily removed horizontally.

The construction shown in Fig. 5 embodies a mold serving to manufacture ornamental plates, the backs of which are also provided with inclined recesses for the purpose already described. In this construction the mold halves are provided with recesses and projections and inclined guideways for slides 25 and 26, so that an inner hollow space is formed in the shape of the plate to be manufactured, when the mold halves are brought together and when the slides 25 and 26 are moved inwardly in proper position. Said slides may be moved by means of any suitable devices. (Not shown.) When the plate is molded and withdrawn from the mold, the funnel-like extension 14' is broken away, which may be easily done, and the plate will be ready for use.

From the foregoing it will be readily seen that my improved molds allow of the manufacture of plates having equal weights, which result has not been attained with accuracy hitherto. This follows from the fact that the excess of liquid mass is retained in the upper reservoir of the mold, and said excess of liquid mass prevents the stamp 16 from moving too far downwardly.

It is evident that changes in the arrangement and minor details of construction may be made without departing from the scope or sacrificing any of the advantages of the invention.

Having fully described my invention, what I claim, and desire to secure by Letters Patent, is—

1. In an apparatus for manufacturing plates of plastic material the combination with two mold halves hinged together, of a rectangular recess in one of said mold halves, another recess in the second mold half, a projecting part on the inner side of the latter the under side of which is inclined downwardly, an upwardly-inclined guideway in the second mold half, a movable slide or piston in said guideway, means for leading a liquid mass into the recesses in the mold halves when the latter are brought close together, and means for producing a slight pressure on the liquid mass during the molding operation, substantially as and for the purpose set forth.

2. In an apparatus for manufacturing plates of plastic material, the combination with two mold halves hinged together, of suitable recesses on the inner faces of said mold halves, said recesses having inclined sides, and forming an inner hollow space in the shape of the plates to be manufactured when the mold halves are brought close together, one or more lateral slides movably arranged in inclined guideways provided in one of said mold halves, suitable recesses in the upper part of the mold halves, a vertically-movable slide or piston in said upper recesses, means for manipulating the mold halves, and means for holding the mold halves in closed positions, substantially as and for the purpose set forth.

3. In an apparatus for manufacturing plates of plastic material, the combination with two mold halves hinged together, of suitable recesses in the inner faces of said mold halves and forming an inner hollow space in the shape of the plates to be manufactured, when the mold halves are brought close together, one or more lateral slides movably arranged in inclined guideways provided in both mold halves, a suitable reservoir in the upper part of the mold and connected to the inner recesses through suitable passages, a vertically-movable slide or piston guided in said reservoir, means for manipulating the mold halves, and means for holding the mold halves in closed position, substantially as and for the purpose set forth.

WERNER FRANZ STIEL.

Witnesses:
CHAS. L. COLE,
HERNANDO DE SOTO.